(12) United States Patent
Cooke et al.

(10) Patent No.: US 6,402,621 B1
(45) Date of Patent: Jun. 11, 2002

(54) TORSIONAL VIBRATION DAMPERS

(75) Inventors: Richard David Maitland Cooke, Warwick; Anthony John Curtis, Leamington Spa, both of (GB); Omar Moirano, Germering (IT); Gerhard Ronner, Palzing (DE); Franz Sedlmeier, Bergen (DE); Wolfgang Dieminger, Grobenzell (DE); Adam Johnson Lambert, Warwick (GB); Stuart John Sleath, Leamington Spa (GB); Alastair John Young, Kenilworth (GB); Heinz Mergarten, Munich (DE); Winfried Keller, Grafing (DE); Werner Kroger, Oberschleissheim (DE); Michael Letzer, Grafing (DE); Werner Wastl, Kirchdorf (DE)

(73) Assignee: AP ATM Limited, Leamington Spa (GB)

( * ) Notice: Subject to any disclaimer, the term of this patent is extended or adjusted under 35 U.S.C. 154(b) by 0 days.

(21) Appl. No.: 09/402,904

(22) PCT Filed: Feb. 12, 1999

(86) PCT No.: PCT/GB99/00445
§ 371 (c)(1),
(2), (4) Date: Jan. 24, 2000

(87) PCT Pub. No.: WO99/41524
PCT Pub. Date: Aug. 19, 1999

(30) Foreign Application Priority Data

Feb. 13, 1998 (GB) .............................................. 9803049
Jul. 21, 1998 (GB) .............................................. 9815747

(51) Int. Cl.[7] ................................................ F16D 3/12
(52) U.S. Cl. .............................. 464/66; 464/67; 464/68; 192/201
(58) Field of Search ........................... 192/201; 464/66, 464/67, 68; 74/574

(56) References Cited

U.S. PATENT DOCUMENTS

| 5,575,364 A | * 11/1996 | Friedmann et al. | 464/67 |
| 5,819,598 A | * 10/1998 | Cooke et al. | 464/68 |
| 5,848,938 A | * 12/1998 | Curtis et al. | 464/66 |
| 6,041,678 A | * 3/2000 | Cooke et al. | 464/68 |

\* cited by examiner

Primary Examiner—Lynne H. Browne
Assistant Examiner—Aaron Dunwoody
(74) Attorney, Agent, or Firm—Paul E Milliken; Ray L Weber

(57) ABSTRACT

A torsional vibration damper, for example a twin mass flywheel (10), has an input element (11) and an output element (12) which are relatively rotatable against the action of a damping means which includes a plurality of linkages (40). Each linkage includes a plurality of interconnected links (41, 42), at least one of which is flexible in an axial sense relative to the remainder of the damper to accommodate forces applied to the flexible link as a result of relative tilting of the damper elements (11, 12) during use of the damper. Various designs of generally radially extending flexible bob weight links (41) and additional connecting links (42) are disclosed.

21 Claims, 8 Drawing Sheets

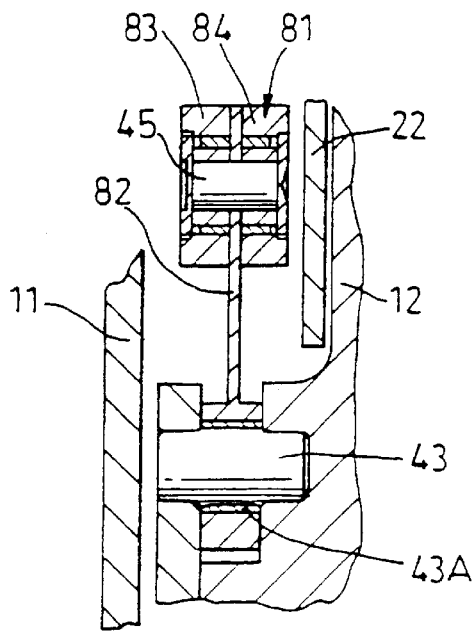
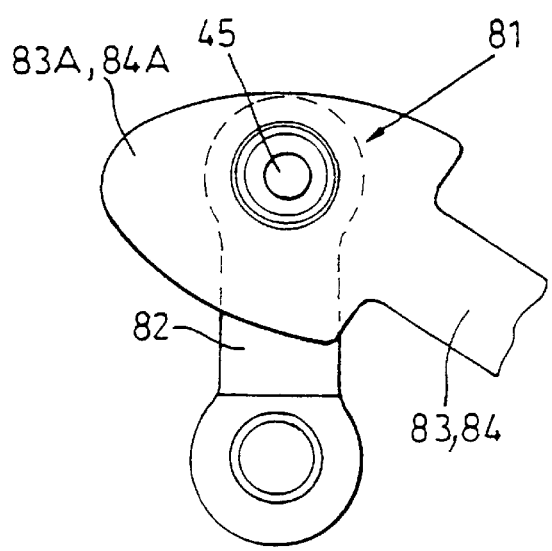
Fig. 9    Fig. 10
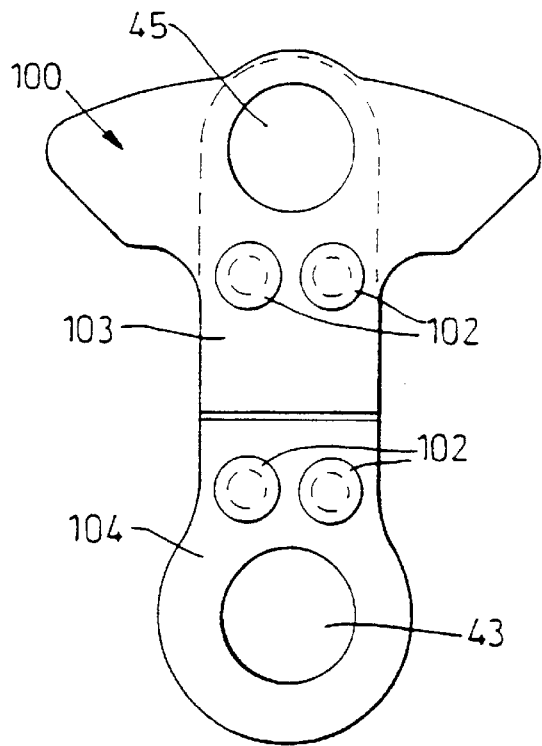
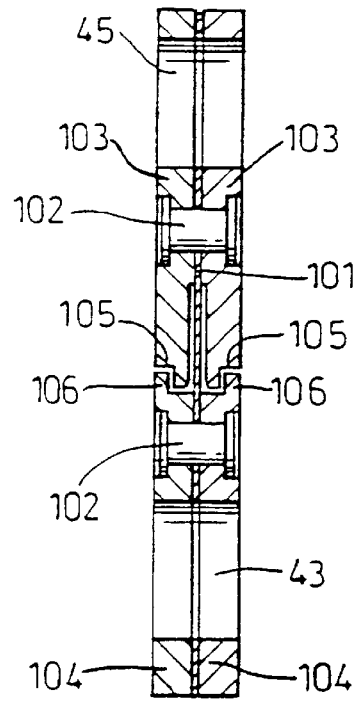
Fig. 11    Fig. 12

TORSIONAL VIBRATION DAMPERS

This invention relates to torsional vibration dampers such as twin mass flywheels and in particular such flywheels used to connect an internal combustion engine with a gearbox on a motor vehicle.

In, for example, earlier granted patents GB 2229793 and 2282868 and pending applications PCT/GB95/01976 and PCT/GB97/00361 there are described torsional vibration dampers in the form of twin mass flywheels in which an input element and an output element are relatively rotatable against the action of a damping means which includes a plurality of linkages each linkage including one or more link members which act as bob-weights to provide a speed dependant damping on the relative rotation of the flywheel elements. The earlier patent applications GB-A-2220464 and PCT/GB97/00362 also disclose torsional vibration dampers used in combination with a fluid coupling in which the relative rotation of input and output elements of the damper is again controlled by a plurality or such linkages.

In the earlier UK application no. 98 01329.5 a number of twin mass flywheel constructions are proposed for overcoming the effect of the tilting of the input flywheel element out of its nominal plane of rotation due to flexing of the crank shaft of the associated internal combustion engine. These various earlier proposals allow relative tilting of the input and output flywheel elements to be accommodated via various self-aligning bearing arrangements which either constitute the main bearing support between the flywheel elements or bearings associated with the bob-weight or other link pivots of the linkages.

It is an object of the present invention to provide further constructions for ameliorating the effect of the tilting of the input element of such a flywheel or the input element of a torsional vibration damper of the form described in GB-A-2220464 and PCT/GB97/00362 referred to above which can be used either in addition to or instead of the various constructions disclosed in the previously referred to UK application no. GB 9801329.5.

Thus according to the present invention there is provided a torsional vibration damper comprising an input element and an output element which are relatively rotatable against the action of a damping means which includes a plurality of linkages, each linkage comprising plurality of interconnected links, the damper being characterized in that at least one of the links is flexible in an axial sense relative to the remainder of the damper to accommodate forces applied to the flexible link as a result of relative tilting of the damper elements.

The present invention is equally applicable to a torsional damper in the form of a twin mass flywheel where the input and output elements comprises input and output flywheel masses respectively or to a damper in which the input and output elements are of relatively light mass and are connected in a drive-line, for example in combination with a fluid coupling as discussed above.

Each linkage may include one or more generally radially extending links pivoted on one element, the or each radially extending link being interconnected with the other element via one or more additional links.

The generally radially extending links and/or the additional links may flex to accommodate relative fitting of the elements.

The generally radially extending links may be arranged to flex by forming an intermediate portion thereof of a smaller axial dimension than the end portions of said link. Typically such a link will be manufactured from an alloy steel to accommodate flexing.

Alternatively, the generally radially extending links may each be formed with an intermediate portion formed from spring steel which is secured to end portions which contain the pivotal connections with the damper element and additional link respectively.

The end portions of each generally radially extending link may be arranged to contact each other after a given amount of axial flexing to limit the maximum axial flexing.

The generally radially extending links may have a concentration of mass at their radially outer ends thus operating as bob-weights which damp the relative rotation of the damper elements.

Each additional link may comprise one or more parallel flexible arms.

For example, each additional Ink may comprise a single flexible arm, the arm being off-set in an axial sense to one side of the associated generally radially extending link.

In an alternative construction each additional link may comprise a single flexible arm mounted centrally in an axial sense relative to the associated generally radially extending link.

In a still further alternative each additional link may comprise a pair of parallel axially spaced flexible arms located one on each side in an axial sense of the associated generally radially extending link.

The additional links may have a mass concentration therein located at the ends of the additional links which are connected with the generally radially extending links.

In addition to use in a vibration damper in which each linkage comprises only two links the present invention is also applicable to dampers which use multi-link linkages to connect the input and output damper elements as, for example, in the Applicant's earlier patent application No PCT/GB97/00361.

The invention also provides a torsional vibration damper comprising relatively rotatable input and output elements which are interconnected by a plurality of linkages which each includes one or more generally radially extending links and one or more generally circumferentially extending links, the damper being characterized in that the generally circumferentially extending links have a mass concentration adjacent one end thereof connected with the generally radially extending links.

The invention shall now be described, by way of example only, with reference to the accompanying drawings in which:

FIGS. 9 and 10 show side and sectional views of part of an alternative linkage arrangement using a generally radially extending flexible link with mass concentrated in a generally circumferentially extending link;

FIGS. 11 and 12 shows an alternative form of flexible bob-weight;

Figure 1:
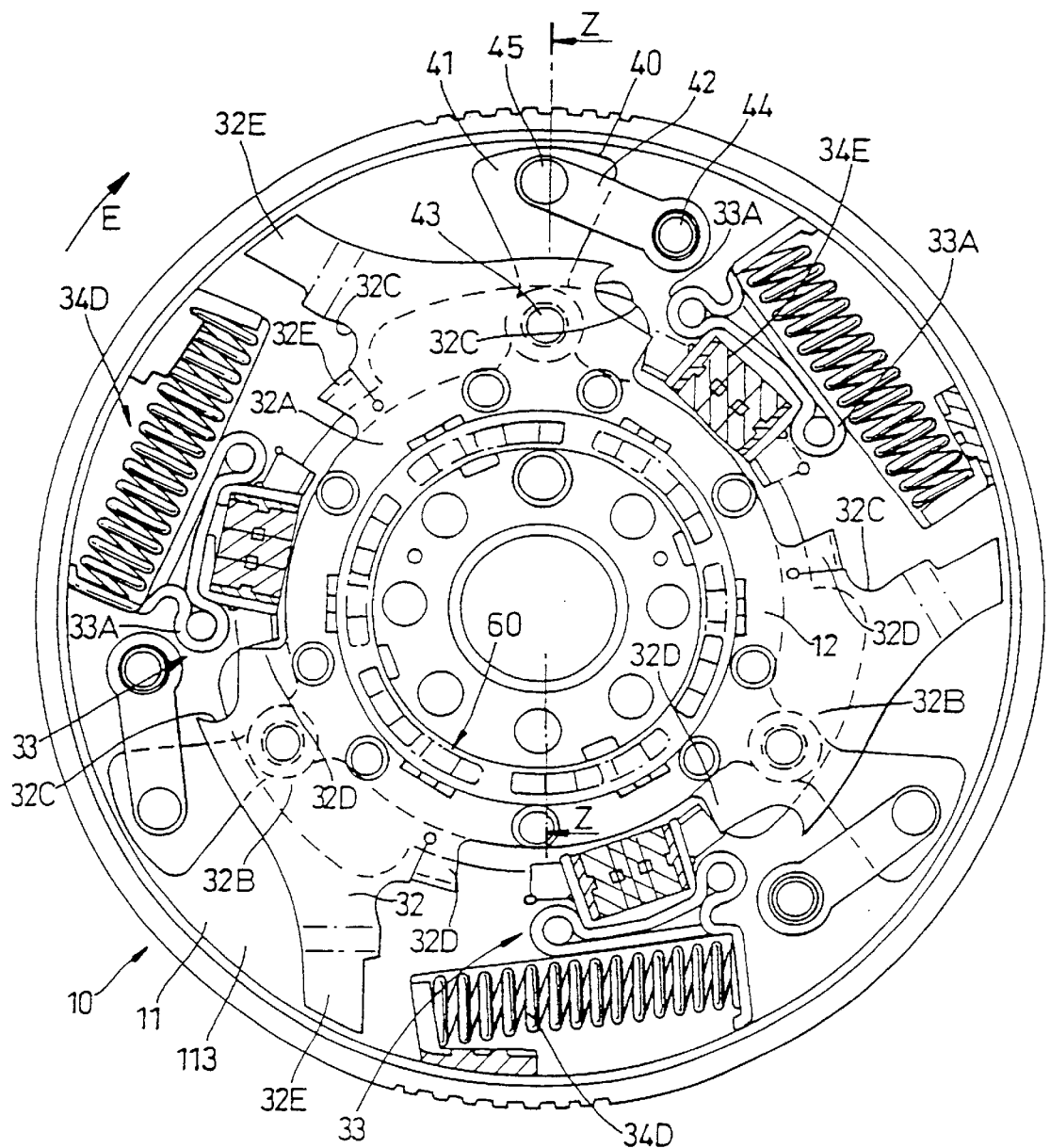
FIG. 1 is a view of a twin mass flywheel taken in the direction B of FIG. 2.
Figure 2:
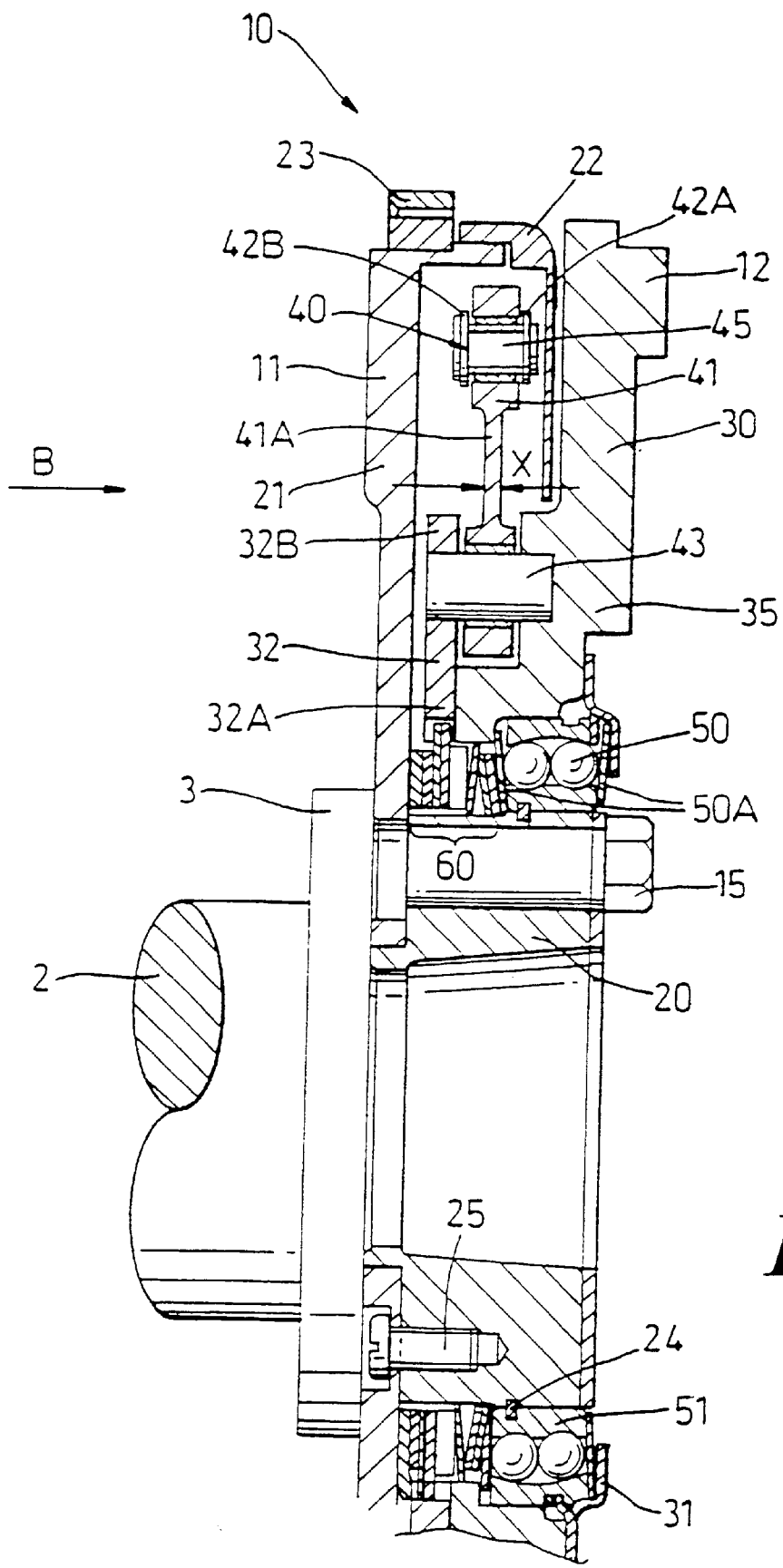
FIG. 2 is a sectional view taken along the line ZZ of FIG. 1.
Figure 3:
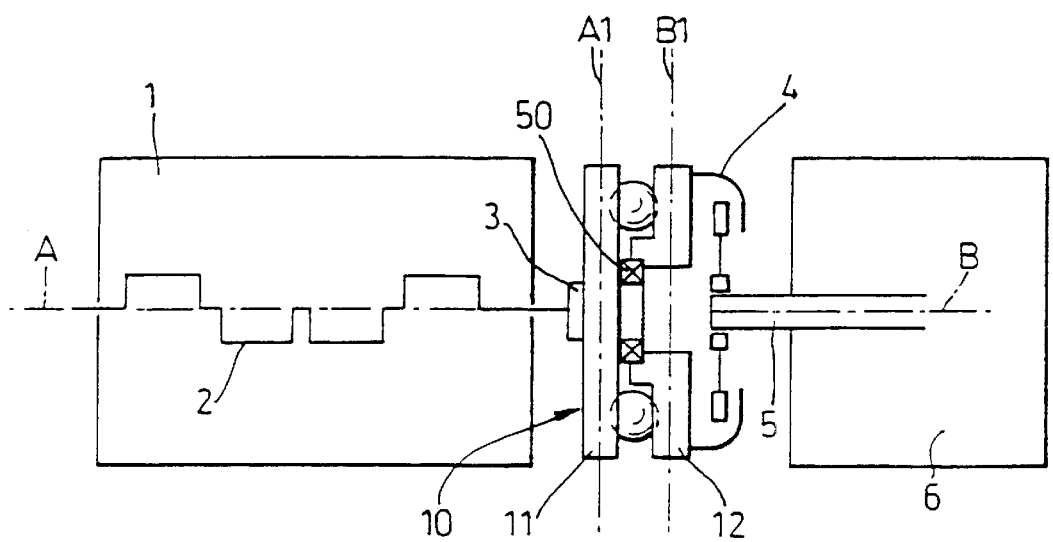
FIG. 3 is a diagrammatic representation of a twin mass flywheel with associated engine and gearbox.

With reference to FIGS. 1, 2 and 3 there is illustrated a torsional vibration damper in the form of a twin mass flywheel 10 which is formed by two damper elements 11 and 12. One flywheel mass 11 (also known as the input flywheel mass) is fixed to a crankshaft 2 of an internal combustion engine 1 by way of a central hub 20 and bolts 15. A friction clutch 4 is secured to the second flywheel mass 12 (also known as the output flywheel mass) to connect the second flywheel mass with the input shaft 5 of an associated gearbox 6.

The flywheel mass 11 comprises a central hub 20, an input plate 21, a cover plate 22, and a starter ring 23 which is welded to the input plate 21. Cover plate 22 is secured at its outer periphery to input plate 21. Circlip 24 secures the inner race 51 of bearing 50 axially relative to the hub 20. The input plate 21 is fixed to hub 20 by screws 25 prior to assembly onto the engine, and then also by the main bolts 15.

The second flywheel mass 12 comprises an output plate 30 a bearing retaining plate 31, and a pivot plate 32 all rotationally fast with each other.

Under normal drive conditions and over-run conditions the twin mass flywheel 10 as a whole rotates in a clockwise direction in the view shown in FIG. 1 as indicated by arrow E. The engine crankshaft nominally rotates about axis A and the gear box input shaft nominally rotates about axis B. Design of the engine, twin mass flywheel and gearbox assembly endeavors to ensure that axis A and B are co-linear. However this is not always the case, especially under running conditions.

Pivot plate 32 has an annular inner portion 32A with plurality of lugs 32B which form part of pivots 43, a plurality of lugs 32C which in conjunction with abutments 33A form an end stop arrangement 33, and a plurality of lugs 32D,32E which act on respective spring units 34D, 34E.

Relative rotation between two damper elements 11 and 12 is controlled by a damping means which primarily comprises a plurality of pivotal linkages 40. The damping means also comprises the plurality of spring units 34D, 34E, a friction damping device 60 and the plurality of end stop arrangements 33. All these components assist in controlling the relative rotation of the two damper elements 11 and 12 at specific relative angular positions or in specific angular ranges.

Each pivotal linkage 40 comprises a generally radially extending link 41 (also known as a bob-weight link) pivotally mounted between a center hub portion 35 of the output plate 30 and pivot plate 32 by way of a first pivot 43, and an additional link 42 (in the form of a parallel pair of arms 42A and 42B) pivotally mounted on the input flywheel mass 11 (by way of a second pivot 44). The links 41 and 42 are pivotally connected to each other and bob-weight 41 by means of a third pivot 45. It will be noted from FIG. 1 that the first pivot 43 is positioned radially inwardly of the second and third pivots 44 and 45. Pivot 43 is pressed into hub 35 and pivot plate 32 and passes through a bearing bush 43A pressed into link 41. Pivot 45 in the form of a rivet passes through a metal spacing bush 45A which in turn passes through a bearing bush 41B which is pressed into link 41. Bearing bushes 43A and 45A are typically made from polymeric material (for example polyimide resin with a filler such as graphite). Many other alternative bush materials could be used, for example, a composite material comprising a PTFE/lead overlay with a bronze impregnated interlayer and a metal backing layer.

Under no-load conditions with the clutch 4 disengaged, centrifugal force acts on the pivotal linkages 40 and particularly on the first bob-weight link 41 and urges the linkages in a radially outward direction with pivot 45 adopting a position radially outboard of pivot 43 as shown in FIG. 1 (this position is regarded as the neutral position between the drive and over-run directions of relative rotation of the damper elements). At higher rotational speeds the centrifugal force is greater and whilst this does not affect the configuration under no-load conditions it greatly affects the force required to move the flywheel mass 12 relative to the flywheel mass 11 i.e. the flywheel torsional stiffness.

If the clutch is engaged and power is transmitted in the drive direction from flywheel mass 11 to flywheel mass 12 there is a tendency for the two masses to rotate relative to each other (flywheel mass 11 rotates clockwise relative to flywheel mass 12 when viewing FIG. 1). At relatively low speeds when the influence of centrifugal force is smaller the damper elements move readily relative to each other i.e. the flywheel torsional stiffness is relatively low. However at relatively high speeds the influence of centrifugal force is much greater and relative rotation of the damper elements requires greater force i.e. the flywheel torsional stiffness is relatively high. Thus the flywheel torsional stiffness is speed sensitive.

If the clutch is engaged and power is transmitted in the over-run direction from flywheel mass 12 to flywheel mass 11 the effects are similar to the above except that the direction of relative rotation is reversed (flywheel mass 11 rotates anticlockwise relative to flywheel mass 12 when viewing FIG. 1) and in the embodiment shown in FIG. 1 the first link 41 folds between the second link 42 i.e. between arms 42A and 42B.

Input flywheel 11 is supported for rotation relative to output flywheel 12 by bearing 50 which in accordance with UK patent application no. 98 01329.5 may be a self-aligning bearing, in this case a double row self-aligning ball bearing which is held in position by retaining member 31 which is secured to output plate 30.

Figure 4:
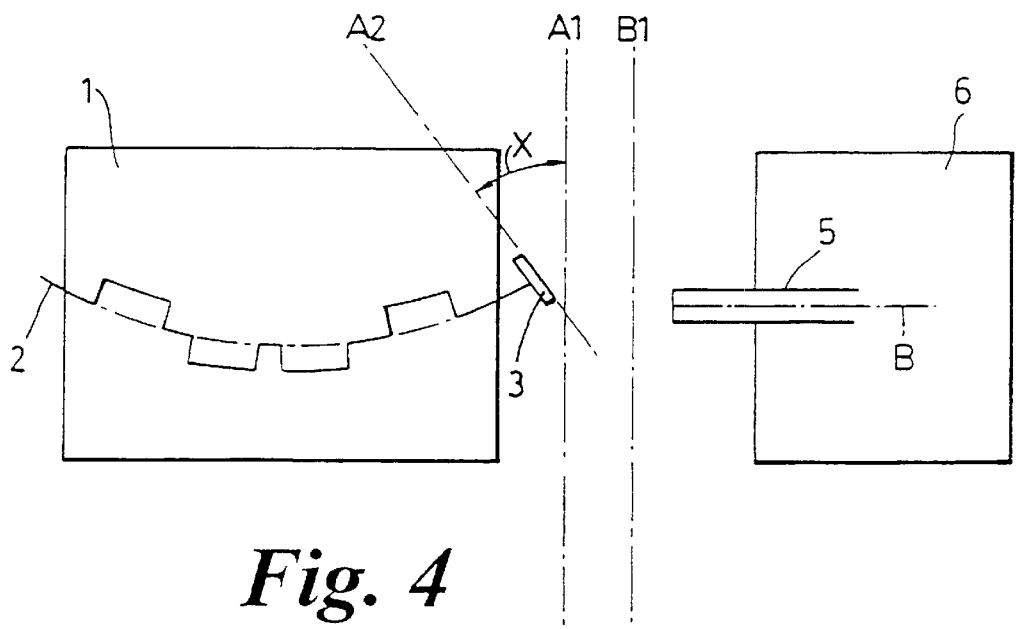
FIG. 4 is a diagrammatic representation of an engine and associated gearbox showing the engine crankshaft flexing.

During operation of the engine, the engine crankshaft 2 can flex, as shown diagramatically in FIG. 4. This flexing can be a first order vibration (i.e. the crankshaft flexes once per revolution) second order vibration (i.e. the crankshaft flexes twice per revolution typically caused by the firing pulses in each cylinder in a 4 stroke engine) and also higher and lower orders of vibrations are possible. Such flexing causes the crankshaft flange 3 (and hence the attached input flywheel 11) to be tilted out of plane A1 in which it normally generally lies by a relatively small but significant amount (X degrees) and into plane A2. Because of the complicated nature of the crankshaft flexing this tilting manifests itself as a tilting vibration which may take the form of a swashing and/or axial movement of the input flywheel.

However the transmission does not cause any such tilting vibrations or swashing in the output flywheel which continues to lie generally in plane B1.

Thus in conventional twin mass flywheels there is a 'fight' between the forces tilting the input flywheel 11 out of its plane A1 and the forces keeping the output flywheel 12 in its true plane B1. This causes stresses in the twin mass flywheel components with the components of each flywheel mass tilting as they rotate by differing amounts depending on the stiffness of the various components. Typically these stresses are seen in the components which link the two flywheels, that is the damping arrangement and the bearing, thus reducing their service life.

However use of the self-aligning bearing 50 allows the input flywheel to lie in any plane as dictated by the flexing of the crankshaft, whilst also allowing the output flywheel to continue to lie in plane B1. Thus any misalignment or tilting of the planes of the input and output flywheels (A1, A2, B1) is accommodated in the self-aligning bearing rather than fought against. This reduces the stresses in the damping components and the bearing, thus increasing the service life of the twin mass flywheel. The range of tilting between the input and output flywheels which the self-aligning bearing 50 accommodates is typically from 0.2 degrees to 3.0 degrees and is more typically 0.5 degrees.

In particular, once the self-aligning bearing allows the output flywheel to rotate true in the plane B1, the bob-weight 41 which is mounted in the output flywheel also runs true and is no longer forced to move back and forth axially as a result of tilting of the input flywheel. This significantly reduces the stresses on the pivot between the bob-weight and the output flywheel thus increasing its service life.

Belleville springs 50A act to bias the planes of the input and output flywheels (A1, B1) parallel to each other and this can be advantageous in some circumstances e.g. during balancing or assembly of the twin mass flywheel.

Figure 5:
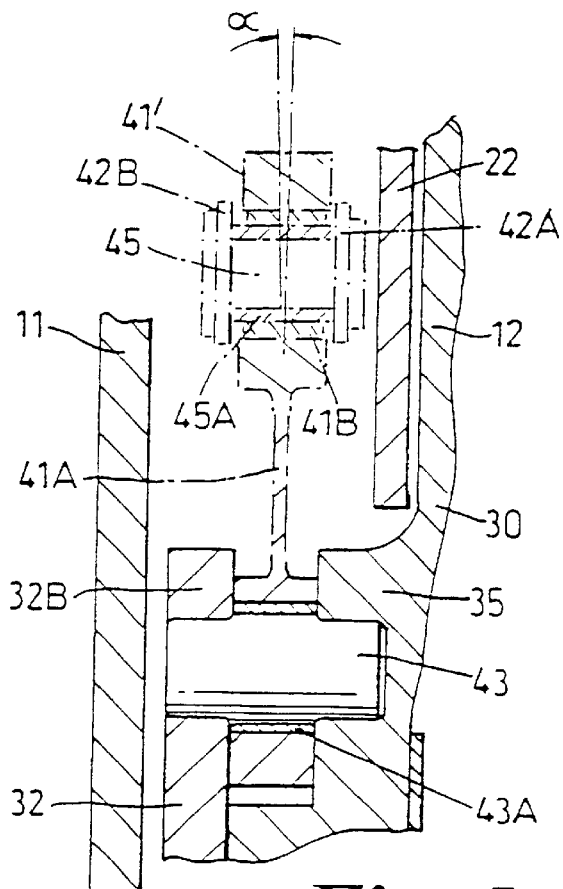
FIG. 5 shows on a larger scale flexing of a bob-weight of the flywheel of FIG. 2.

In accordance with the present invention each generally radially extending bob-weight link 41 has an intermediate portion 41A of reduced axial thickness 'x' which allows the link to flex in an axial sense by an angle (typically in the range 0.2° to 5°) relative to the remainder of the flywheel as shown in dotted detail 41' in FIG. 5 as a result of the forces applied to link 41 due to tilting of the input flywheel 11 as shown in FIG. 4.

Although the flywheel 10 described above is provided both with a main self-aligning bearing 50 and the flexible links 41 the self-aligning bearing 50 may be omitted and the flexible links 41 may be used on their own in certain applications.

Figure 6:
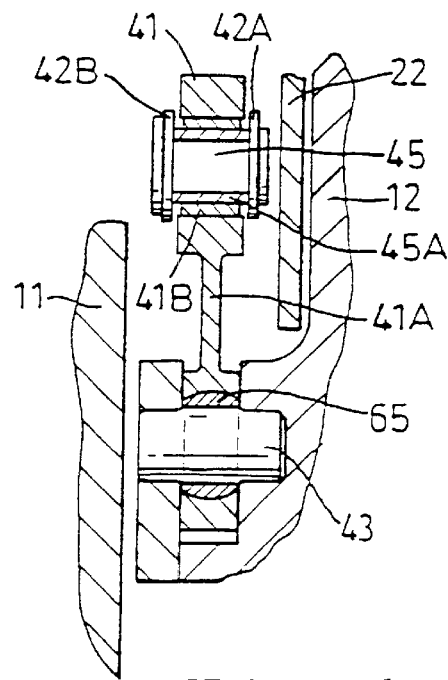
FIG. 6 shows a view similar to FIG. 5 of an alternative form of bearing support for the bob-weight of FIG. 5.

Alternatively, in addition to flexible links 41, as disclosed in the applicant's earlier UK application no. 98 01329.5 the bearings associated with any of pins 43, 44 and 45 may be self-aligning as shown, for example, in FIG. 6 where self-aligning bearing 65 is used in association with pin 43.

Figure 7:
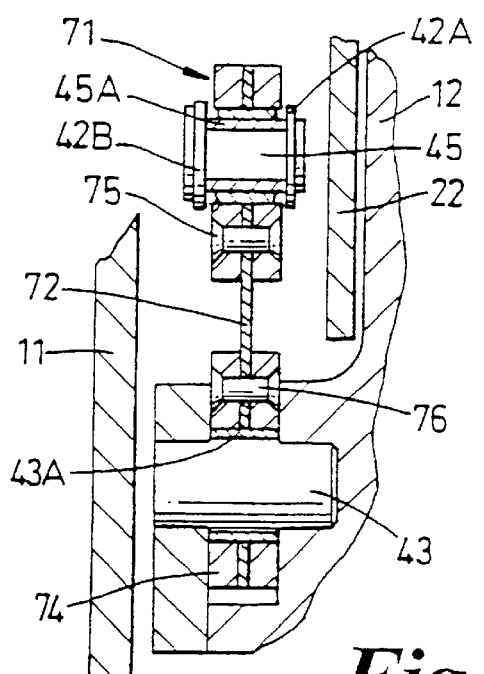
FIGS. 7 and 8 show side and sectional views of an alternative form of flexible bob-weight.
Figure 8:
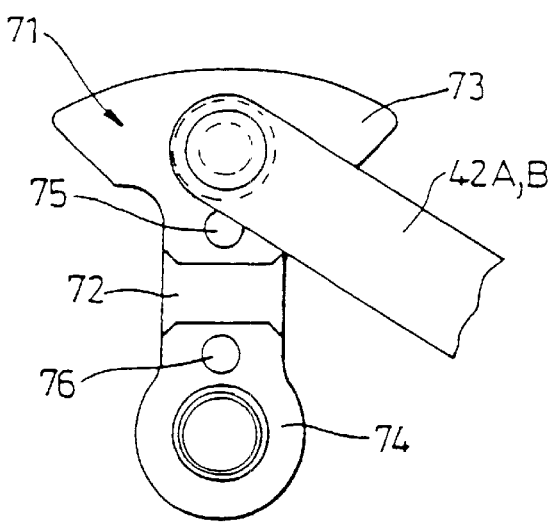

FIGS. 7 and 8 show an alternative form of flexible bob-weight link 71 which replaces bob-weight 41. Bob-weight 71 is formed in three parts on intermediate flexible portion 72 which is formed from spring steel an outer portion 73 which includes pivot 45 and an inner portion 74 which includes pivot 43. The three parts are riveted together at 75 and 76.

The inventive concept of the present invention, that is the use of flexible links 41, may also be used in respect of any of the generally radially extending links employed in any of the multi-link linkages disclosed in the twin mass flywheels or torsional damping arrangement described in earlier patent application no. PCT/GB97/00361.

FIGS. 9 and 10 show an alternative linkage arrangement in which each generally radially extending link 81 has a reduced section flexible intermediate portion 82 which is connected via pivot 45 with links 83 and 84 which replace links 42A and 42B. As can be seen from FIGS. 9 and 10 the end of links 83 and 84 which house pivot 45 have increased mass portions 83a and 83b respectively which replace the enlarged radially outer portion of link 41. Thus the mass of the linkage is built into generally circumferentially extending links 83 and 84 rather than generally radially extending link 81 with the center of mass of links 83 and 84 being nearer the ends of these links connected to generally radially extending link 81.

This principle of building weight into the generally circumferentially extending links rather than the generally radially extending links is applicable to linkages which include both rigid and flexible generally radially extending links as well as linkages which use self-aligning main or linkage pivot bearings.

FIGS. 11 and 12 show an alternative form of flexible bob-weight link 100 which comprises a central flexible blade 101 on either side of which are riveted at 102 outer bob-weight portions 103 and inner bob-weight portions 104. As can be seen from FIG. 102, the radially inner edges of outer bob-weight portions 103 are provided with shoulders 105 which are adjacent flanges 106 provided on the radially outer edges of inner bob-weight portions 104.

When in use, the outer portions 103 of bob-weight 100 can flex through an angle typically 0.2 to 5.0 degrees relative to the inner portions 104. This flexing angle can be controlled by the initial clearance provided between shoulders 105 and flanges 106. Angle being ultimately limited by contact between shoulders 105 and flanges 106. By controlling the maximum flexing of bob-weight 100 the resonance of the linkage which connects the flywheel masses can be avoided.

In addition (or as an alternative to) the various flexible generally radially extending link arrangements described above the additional links 42 may be designed to flex to accommodate relative tilting of the flywheel masses 11 and 12.

Figure 13:
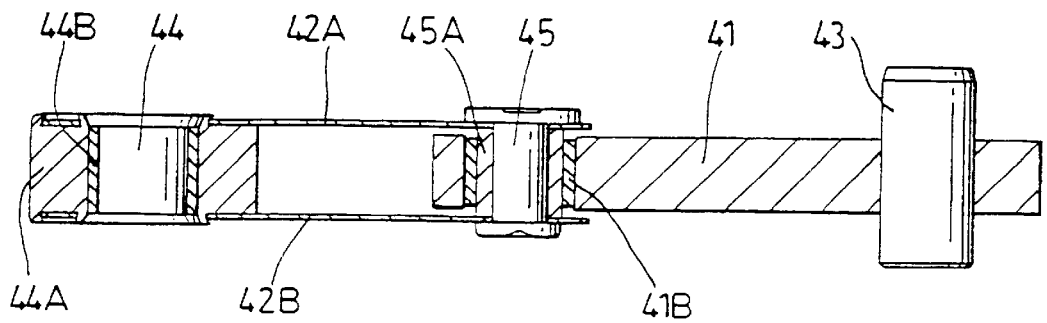
FIG. 13 shows a view in the direction C of FIG. 14.
Figure 14:
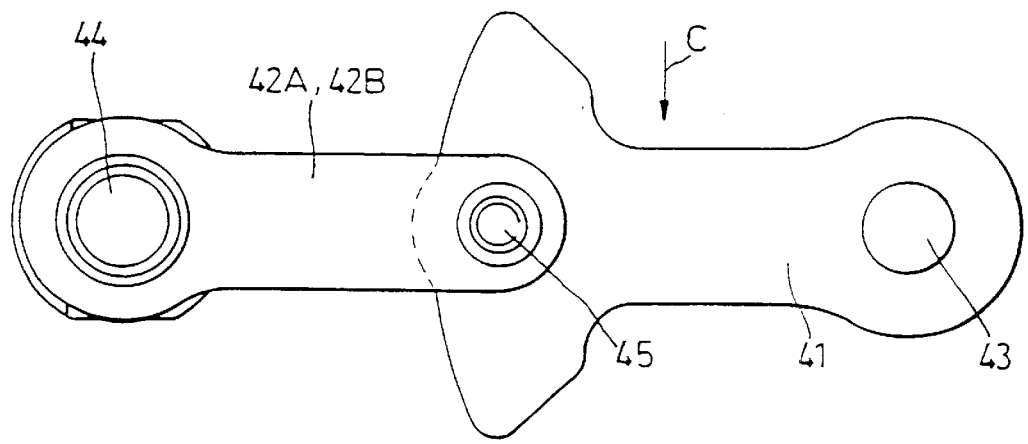
FIG. 14 shows a side view of a flywheel connecting linkage with flexible links in a longitudinally extended configuration.

For example, as shown in FIGS. 13 and 14, links 42 may be made from spring steel and in the form of a pair of parallel spaced arms 42A and 42B held apart by spacers 44A and 45A with spacers 45A pivoting in bushes 41B which are pressed into links 41. Spacers 44A have bushes 44B for pivots 44 pressed into them. FIGS. 13 and 14 show the linkage, for ease of illustration, in an extended configuration with a non-flexible bob-weight link 41 of modified shape (generally T-shaped) to place more mass further from pivot 43 to increase the centrifugal effect of the bob-weight.

Figure 15:
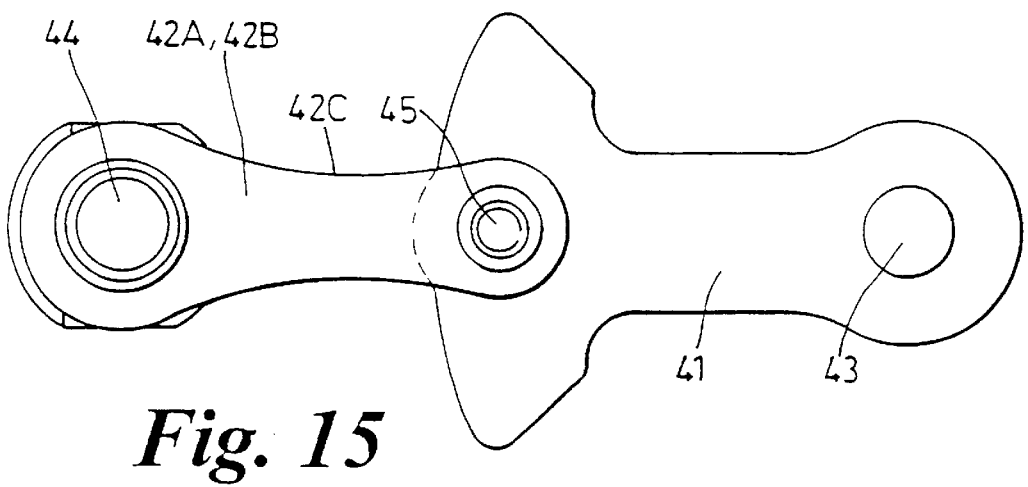
FIG. 15 shows a view corresponding to FIG. 14 of an alternative form of connecting linkage.

Flexible links 42A, 42B are loaded both in bending and twisting as a result of the tilting of the input flywheel. To allow more twisting of links 42A and 42B these arms may have a necked central portion 42C as shown in FIG. 15.

Figure 16:
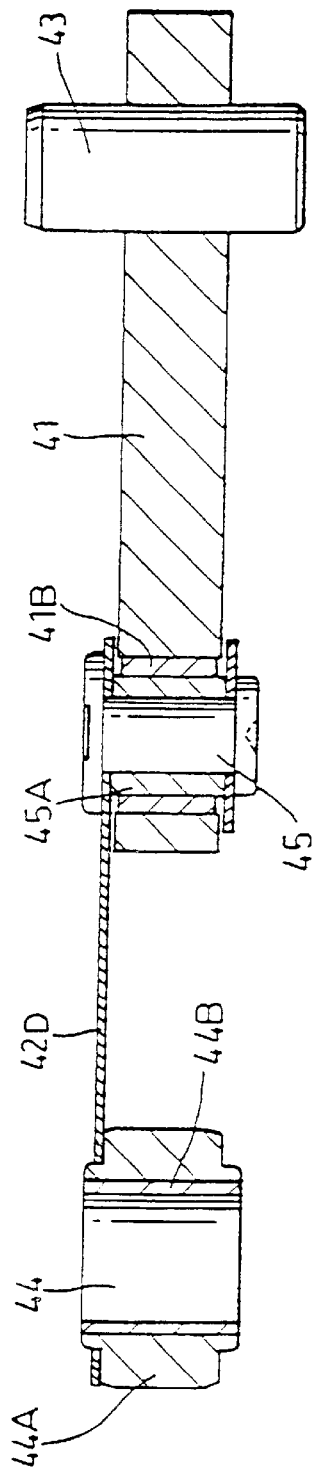
FIGS. 16 to 19 show views corresponding to FIG. 13 of further alternative connecting linkages.

FIG. 16 shows an alternative single flexible arm 42D of spring steel which is offset to one side of the associated bob-weight 41. This arrangement is particularly effective at accommodating relative tilting of the flywheel masses.

Figure 17:
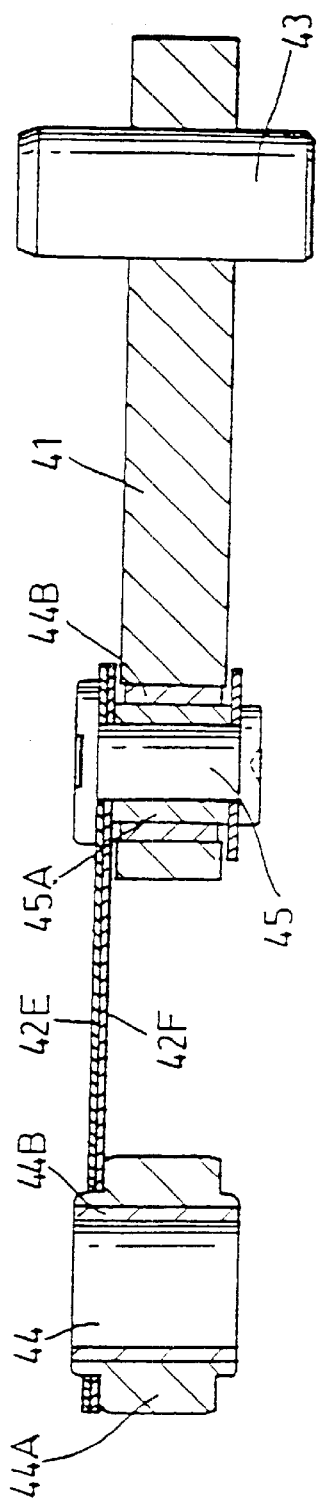

FIG. 17 shows a further alternative form of link 42 in which two flexible spring steel arms 42E and 42F which are in contact with each other are used. In such an arrangement the number of contacting arms may be varied to obtain the required overall flexibility of the link 42.

Figure 18:
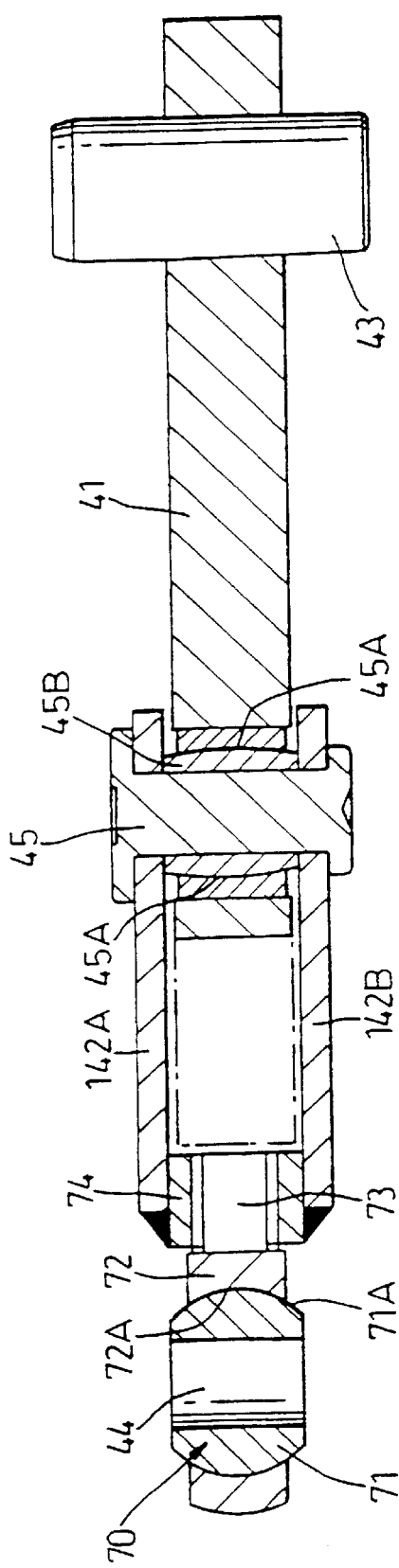

FIG. 18 shows a further arrangement for accommodating movement between pivots 43 and 44 of each linkage in which rigid arms 142A and 142B are used and a self-aligning ball joint 70 (e.g. a Rose joint) is used to connect with pivot 44. Joint 70 has an inner portion 71 mounted on pivot 44 and an outer part 72 which has a screw-threaded portion 73 which is screwed into a block 74 welded between arms 142A, 142B. The inner part 71 and outer part 72 have co-operating part spherical surfaces 71A and 72A respectively which allow the two parts to articulate relative to each other. Pivot 45 may also be made self-aligning by providing part-spherical surfaces 45A on a sleeve 45B surrounding pivot 45.

Figure 19:
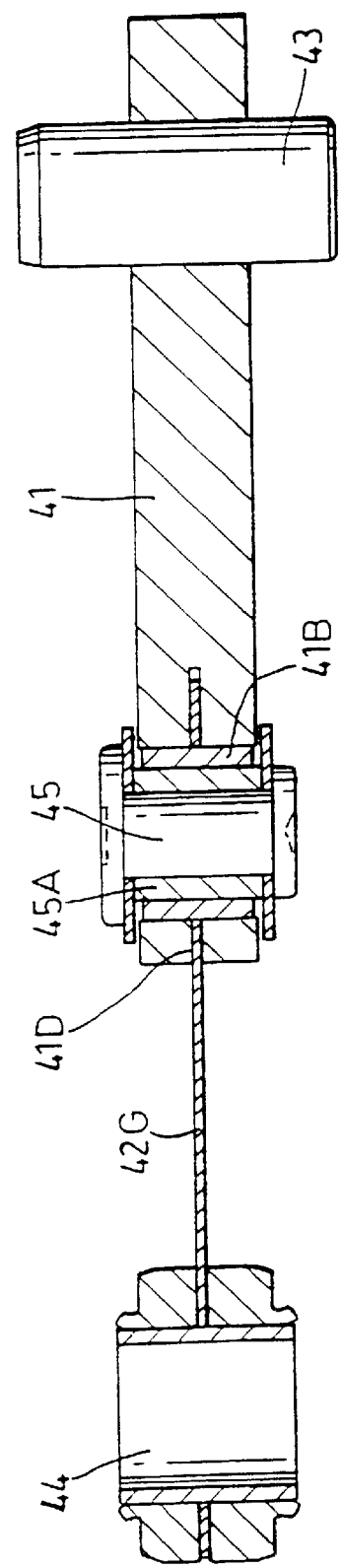

FIG. 19 shows yet a further alternative for accommodating movement between pivots 43 and 44 in which Sink 42 comprises a single flexible spring steel arm 42G which is located centrally, in an axial sense, relative to bob-weight 41 in a slot 41D and also centrally relative to pivot 44. Such an arrangement whilst more expensive to produce does provide a more symmetrical loading of the linkage.

Figure 20:
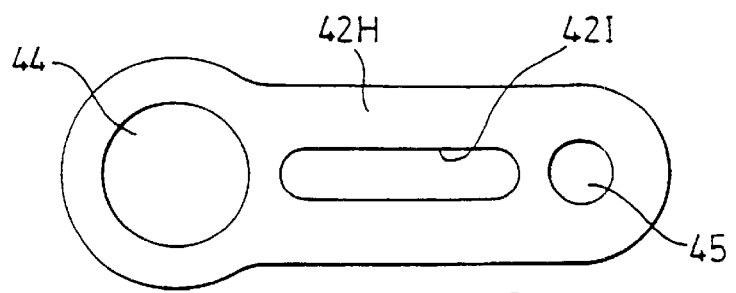
FIG. 20 shows an alternative link which may be shown with the connecting linkages of the type shown in FIGS. 13, 16, 17 or 19.

FIG. 20 shows a further alternative form of link 42 comprising a flexible spring steel arm 42H which includes an aperture in the form of a longitudinally extending slot 42I to increase the flexibility of the link. The position and size of slot 42I can be varied, together with the thickness of the material from which the link is made, to tune the flexibility of the link to the overall desired performance for the damper concerned. Other aperture shapes and positions could be employed depending on the desired flexibility characteristics of the link. The link can be used singly as shown in, for example FIGS. 16 or 19, as a spaced pair of links shown in FIG. 13 or as a contacting pair of links shown in FIG. 17.

The various measures described above are suitable for a torsional damper in the form of a twin mass flywheel where the input and output elements comprises input and output flywheel masses respectively or to a damper in which the input and output elements are of relatively light mass and are connected in a drive-line either as a separate unit or in combination with a fluid coupling as discussed above. These measures also apply to torsional dampers irrespective of the number of links in each interconnecting linkage. For example, the measures are useable with the multi-link linkages of the earlier pending application No PCTVGB97/00361.

What is claimed is:

1. A torsional vibration damper (10) comprising an input element (11) and an output element (12) which are relatively rotatable against the action of a damping means which includes a plurality of linkages (40) each linkage comprising plurality of interconnected links (41, 42), the damper being characterized in that at least one of the links (41, 42) is flexible in an axial sense relative to the remainder of the damper to accommodate forces applied to the flexible link as a result of relative tilting of the damper elements (11,12).

2. A damper according to claim 1 in which each linkage (40) includes one or more generally radially extending links (41) pivoted on one element (12), the or each radially extending link being interconnected with the other element (11) via one or more additional links (42), the damper being characterized in that at least the generally radially extending links (41) or the additional links (42) flex to accommodate relative tilting of the damper elements (11,12).

3. A damper according to claim 2 characterized in that the radially extending links (41) are arranged to flex by forming an intermediate portion (41A) thereof of a smaller axial dimension (x) than the end portions of said link.

4. A damper according to claim 3 characterized in that the radially extending links (41) are manufactured from an alloy steel to accommodate flexing.

5. A damper according to claim 2 characterized in that the generally radially extending links (71) are each formed with an intermediate portion (72) formed from spring steel which is secured to end portions (73,74) which contain the pivotal connections with the damper element (12) and additional link (42a, 42b) respectively.

6. A damper according to claim 5 characterized in that the end portions (105, 106) of each generally radially extending link (100) are arranged to contact each other after a given amount ( ) of axial flexing to limit the maximum axial flexing.

7. A damper according to claim 2 above characterized in that the radially extending links (41) have a concentration of mass at their radially outer ends thus operating as bob-weights which damp the relative rotation of the damper elements (11,12).

8. A damper according to claim 2 characterized in that the generally radially extending links may be mounted on t he input or output damper elements (11,12).

9. A damper according to claim 2 characterized in that the or at least one additional link (42) of each linkage comprises one or more parallel flexible arms (42A, 42B).

10. A damper according to claim 9 characterized in that the or at least one additional link of each linkage comprises a single flexible arm (42D), the arm being off-set in an axial sense to one side of the associated generally radially extending link (41).

11. A damper according to claim 9 characterized in that the or at least one additional link of each linkage comprises a single flexible arm (42G) mounted centrally (41D) in an axial sense relative to the associated generally radially extending link (41).

12. A damper according to claim 9 characterized in that the or at least one additional link (42) of each linkage comprises a pair of parallel axially spaced flexible arms (42A, 42B) located one on each side in an axial sense of the associated generally radially extending link (41).

13. A damper according to claim 9 characterized in that the or at least one additional link (42) of each linkage has a necked central portion (42C) to increase flexibility.

14. A damper according to claim 9 characterized in that the or at least one additional link of each linkage has one or more apertures (42I) formed therein to aid flexibility.

15. A damper according to claim 14 characterized in that the aperture (42I) is in the form of a slot which extends longitudinally of the link.

16. A damper according to claim 2 characterized in that the additional links (83, 84) have a mass concentration therein (83A, 83B) located at the ends of the additional links which are connected with the generally radially extending links (82).

17. A damper according to claim 2 characterized in that the additional links (142A, 142B) are connected with the generally radially extending links (41) and with associated damper element (12) by self-aligning pivots (45A, 45B, 71A, 72A) to allow relative tilting of the damper elements (11,12).

18. A damper according to claim 1 characterized by being in the form of a twin mass flywheel where the input and output elements comprises input and output flywheel masses (11,12) respectively.

19. A damper according to claim 1 characterized in that the input and output elements are of relatively light mass and are connected in a drive-line.

20. A damper according to claim 19 characterized by being connected in combination with a fluid coupling.

21. A torsional vibration damper comprising relatively rotatable input and output elements (11, 12) which are interconnected by a plurality of linkages which each includes one or more generally radially extending links (82) and one of more generally circumferentially extending links (82, 84), the damper being characterized in that the generally circumferentially extending links (82, 84) have a mass concentration (83A, 83B) adjacent one end thereof connected (45) with the generally radially extending links (82).

* * * * *